3,260,715
FLUORESCENT BIS-BENZOXAZOLYL STILBENES
David G. Saunders, Wealdstone, Harrow, England, assignor to Eastman Kodak Company, Rochester, N.Y., a corporation of New Jersey
No Drawing. Filed Apr. 16, 1963, Ser. No. 273,283
Claims priority, application Great Britain, Dec. 17, 1962, 47,527/62
9 Claims. (Cl. 260—240)

This invention relates to novel organic compounds and to a method for preparing them and more particularly to novel benzoxazolyl derivatives of stilbene which are useful as fluorescent whitening and brightening agents for textile fibers, papers, resins, photographic color print materials, and the like.

The compounds of the invention are novel fluorescent compounds of the formula:

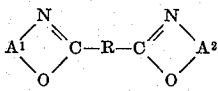

in which the radical R is a bivalent 4,4'-stilbene radical and each of the radicals $A^1$ and $A^2$ is an o-phenylene radical.

The compounds of the invention thus comprise the novel class of stilbene derivatives having benzoxazolyl substituents in the 4,4' positions of the stilbene radicals. The compounds of this class have unexpectedly superior fluorescent properties when used as whitening or brightening agents and, in addition, have certain other properties; such as, heat stability, light stability, stability toward bleaches, stability in textile processing treatments, etc., which make them especially useful as whitening or brightening agents for textile materials, particularly for synthetic linear polyester textile fibers.

In the above formula for the novel compounds of my invention, R is a bivalent 4,4'-stilbene radical of the formula:

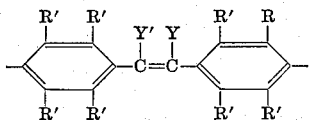

and each of $A^1$ and $A^2$ is an o-phenylene radical of the formula

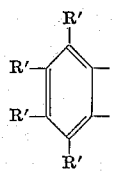

The substituents R' of the bivalent 4,4'-stilbene radical and of each of the o-phenylene radicals can be the same or different monovalent substituents bound to the ring by a covalent bond and can be any such substituent which does not destroy the desirable fluorescent properties of the 4,4'-bis(benzoxazol-2-yl)stilbene compound. The substituents Y and Y' of the 4,4'-stilbene radical can be the same or different monovalent substituents bound to the respective carbon atoms to which they are attached by a covalent bond and can be any such substituent which does not destroy the desirable fluorescent properties of the 4,4'-bis(benzoxazol-2-yl)stilbene compound.

Typical monovalent substituents Y and Y' which are suitable include a hydrogen atom and alkyl, aryl and cyano radicals. When Y or Y' is alkyl it is preferably alkyl of 1 to 18 carbon atoms such as methyl, ethyl, n-butyl, i-butyl, 2-ethylhexyl, n-pentyl, n-hexyl, n-decyl, dodecyl or cetyl, for example. When Y or Y' is aryl it is preferably mononuclear aryl such as phenyl, methylphenyl, methoxyphenyl, ethylphenyl, chlorophenyl and bromophenyl for example.

Typical monovalent substituents R' which are suitable include a hydrogen atom, a halogen atom and alkyl, aryl, substituted aryl, hydroxy, alkoxy, aryloxy, acyl, acyloxy, amino, substituted amino, quaternized ammonium, sulfo, substituted sulfonyl, sulfamyl, substituted sulfamyl, cyano, thiocyano, thiol, carbamyl, substituted carbamyl, carbamoyloxy, and nitro groups, for example. The monovalent substituents named are illustrative, and not limitative, because, as noted, any monovalent substituent bound to the ring by a covalent bond which does not destroy the desirable fluorescent properties of the 4,4'-bis(benzoxazol-2-yl)stilbene compound can be present.

Chlorine, bromine, fluorine and iodine atoms are illustrative of the halogen atoms represented by R'. When R' is alkyl it preferably has 1 to 18 carbon atoms, such as methyl, ethyl, propyl, isopropyl, n-butyl, isobutyl, n-pentyl, n-hexyl, n-decyl, n-dodecyl, n-hexadecyl, or n-octadecyl, for example. When R' is aryl or substituted aryl it is preferably mononuclear aryl such as phenyl, methylphenyl, ethylphenyl, chlorophenyl, bromophenyl, methoxyphenyl, ethoxyphenyl or other substituted phenyl nuclei. However, R' can also be an aryl nucleus such as 1-naphthyl or 2-naphthyl and substituted derivatives thereof, or a heterocyclic nucleus such as furyl, thienyl, etc., for example. Illustrative of the alkoxy groups represented by R' are alkoxy groups having from 1 to 18 carbon atoms, and preferably from 1 to 4 carbon atoms, such as methoxy, ethoxy, propoxy, isopropoxy, n-butoxy, isobutoxy, n-amoxy, isoamoxy and hexoxy, for example. Phenoxy and naphthoxy are illustrative aryloxy groups represented by R'. Formyl, acetyl, propionyl, butyryl, isobutyryl, benzoyl and naphthoyl, for example are illustrative of the acyl groups represented by R'. Acetoxy, benzoxy, $CH_3CH_2COO$—, $CH_3CH_2CH_2COO$— and $CH_3CH_2CH_2CH_2CH_2COO$—, for example, are illustrative of the acyloxy groups represented by R'. Monoalkylamino, dialkylamino, wherein the alkyl groups are the same or different, arylamino, aralkylamino, cycloalkylamino, monohydroxyalkylamino, dihydroxyalkylamino alkoxyalkylamino and other aliphatic amino groups, for example are illustrative of the substituted amino groups represented by R'. Normally the alkyl, hydroxyalkyl or alkoxyalkyl groups present in such amino groups contain no more than 4 carbon atoms although they can contain more.

Illustrative of the substituted sulfonyl groups represented by R' are alkylsulfonyl groups having from 1 to 18 carbon atoms and preferably from 1 to 4 carbon atoms such as methylsulfonyl, ethylsulfonyl, propylsulfonyl, butylsulfonyl, etc., and arylsulfonyl, preferably mononuclear arylsulfonyl such as phenylsulfonyl, methylphenylsulfonyl, chlorophenylsulfonyl and ethoxyphenylsulfonyl. Illustrative of the substituted sulfamyl groups represented by R' are alkyl and dialkylsulfamyl such as N,N-dimethysulfamyl, N,N - diethylsulfamyl, N,N - dipropylsulfamyl, N-ethylsulfamyl, N-methylsulfamyl, N-butylsulfamyl, and N-ethyl-N-butylsulfamyl; aryl and diarylsulfamyl such as N-phenylsulfamyl, N,N-diphenylsulfamyl, N,N - diethylphenylsulfamyl; N - phenyl-N-ethylphenylsulfamyl, N,N-dibutylphenylsulfamyl and N-ethoxyphenylsulfamyl; N-alkyl-N-arylsulfamyl such as N-ethyl - N - phenylsulfamyl, N-methyl-N-(methoxyphenyl)sulfamyl and N-butyl-N-chlorophenylsulfamyl.

Illustrative of the substituted carbamyl groups represented by R' are alkylcarbamyl and dialkylcarbamyl groups wherein the alkyl radicals preferably contain from 1 to 4 carbon atoms, such as N-methylcarbamyl, N-ethylcarbamyl, N-propyplcarbamyl, N-isopropylycarbamyl, N-butylcarbamyl, N,N-dimethylcarbamyl, N,N-diethylcarbamyl, N,N - dibutylcarbamyl and N - ethyl - N-methylcarbamyl; aryl and diarylcarbamyl such as N-phenylcarbamyl, N,N-diphenylcarbamyl, N,N-di(ethylphenyl)carbamyl and N,N-di(methoxyphenyl) carbamyl.

R′ can also ba a

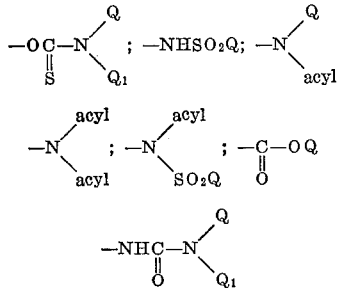

group, for example, wherein Q and $Q_1$ each are a hydrogen atom, an alkyl group (preferably having 1 to 4 carbon atoms), a substituted alkyl group (preferably having no more than 4 carbon atoms), an aryl group (such as phenyl, methylphenyl, ethylphenyl, methoxyphenyl, ethoxyphenyl, chlorophenyl or bromophenyl, for example) and a cycloalkyl group (such as cyclobutyl, cyclopentyl or cyclohexyl).

The term acyl, unless otherwise indicated, is used broadly and includes, in addition to acyl groups noted hereinbefore, groups such as the ureido group, $—SO_2Q$ groups and

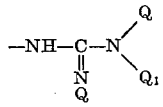

groups, wherein Q and $Q_1$ have the meaning previously assigned to them.

R′ can also be a fluorinated alkyl group having 1 to 18 carbon atoms. Difluoroalkyl groups having the formula $—(CH_2)_nCHF_2$ and trifluoroalkyl groups having the formula $—(CH_2)_nCF_3$ wherein $n$ is a whole number from 1 to 17 are illustrative. Higher fluorinated alkyl groups such as $—(CH_2)_{m1}(CF_2)_m—CF_3$ where $m$ is 1 to 4, for example, and $m_1$ is 1 or 2, can also be present. 2,2-difluoroethyl, 3,3-difluoro-n-propyl, 4,4-difluoro-n-butyl, 5,5-difluoro-n-amyl, 6,6-difluoro-n-hexyl, 2,2,2-trifluoroethyl, 3,3,3-trifluoro-n-propyl, 4,4,4-trifluoro-n-butyl, 5,5,5 - trifluoro - n - amyl, 6,6,6 - trifluoro - n - hexyl,

—$CH_2CH_2CF_3$; —$CH_2CH_2CF_2CF_3$;

—$CH_2CH_2CH_2CF_2CF_3$ and —$CH_2CH_2CF_2CF_2CF_3$ are illustrative of the fluorinated zalkyl groups which R′ can be.

R′ can also be an unsaturated acyclic hydrocarbon radical such as allyl, 1-butenyl, 2-butenyl, 3-butenyl, 1-pentenyl, 2-pentenyl, 3-pentenyl, isobutenyl and 1-isopentenyl for example.

Normally no more than 1 of the R′ substituents present in each of the phenyl nuclei of the bivalent 4,4′-stilbene radical is other than a hydrogen atom. The simpler 4,4′-bis(benzoxazol-2-yl)stilbene compounds are often preferred because they are cheaper, more easily prepared and, in some instances, are better fluorescent brightening agents than the more complex 4,4′-bis(benzoxazol-2-yl)-stilbene compounds.

The novel fluorescent compounds of my invention can be prepared by the method which comprises heating under a vacuum to a temperature of about 200° C. to about 400° C. a 4,4′-bis(2-hydroxyphenylcarbamoyl)stilbene compound. A preferred embodiment of my invention comprises preparing a fluorsecent compound by heating a 4′4′-bis (2-hydroxyphenyl-carbamoyl)stilbene compound to a temperature of about 300° C. to about 350° C. under a pressure less than 20″ Hg. The 4,4′-bis(2-hydroxyphenylcarbamoyl)stilbene compounds that are useful in the practice of my invention can be prepared by reacting a 4,4′-stilbene dicarboxylic acid chloride with an o-aminophenol in the presence of a solvent such as dioxan. The 4,4′-stilbene dicarboxylic acid chloride compounds that are useful in the practice of my invention can be prepared by reacting a 4,4′-stilbene dicarboxylic acid with thionyl chloride and phosphorus pentachloride according to the method of Hager et al., J.A.C.S., 68, 2167 (1946).

The desired 4,4′-stilbene dicarboxylic acid can be prepared by a number of methods. One is the method disclosed in Toland et al., J.A.C.S., 75, 2263 (1953) and U.S. Patent 2,610,191 which comprises reacting a p-toluic acid with sulfur. Another is the method of Harris, J.C.S., 1947, 690 which comprises condensing a 4-bromophenylacetate with a 4-bromobenzaldehyde to give a 4,4′-dibromostilbene-α-carboxylic acid which is converted to the desired 4,4′-stilbene dicarboxylic acid. Another method comprises condensing a p-cyanobenzaldehyde with a p-cyanobenzylcyanide according to the method of Bell et al., J.C.S., 1948, 1024 to give a 4,4′-α-tricyanostilbene which is converted to an α-cyanostilbene dicarboxylic acid.

The following examples illustrate the preparation of typical 4,4′-bis(benzoxazol)stilbene compounds within the scope of my invention.

*Example 1.—4,4′-bis(benzoxazol-2-yl)stilbene*

4,4′-stilbenedicarboxylic acid was prepared from p-toluic acid by the method of J.A.C.S., 1953, 75, 2263. 4,4′-stilbenedicarboxylic acid chloride was prepared from the 4,4′-stilbenedicarboxylic acid according to the method of J.A.C.S., 1946, 68, 2167.

4-4′-bis(2-hydroxyphenylcarbamoyl)stilbene was prepared by dissolving the 4,4′-stilbenedicarboxylic acid chloride (1.5 grams) in hot dioxan (50 ml.) and adding o-aminophenol (1,1 gram) dissolved in dioxan (5 ml.) to the solution. An immediate precipitate came down. The mixture was refluxed 2 hours to complete the reaction, cooled and 1.8 grams of a brown precipitate decomposing at 300-320° C. was collected. The brown precipitate of 4,4′ - bis(2 - hydroxyphenylcarbamoyl)stilbene (1.8 grams) was heated under vacuum in an oil bath at 320–340° until the reaction subsided. The product was cooled under vacuum and Soxhlet extracted with benzene. From the benzene solution crystallized lustrous yellow flakes of 4,4′-bis(benzoxazol-2-yl)stilbene (0.93 gram) M.P. 365–8°.

Anal.—Found: C, 81.3, H, 4.60, N, 6.65%; $C_{28}H_{18}N_2O_2$ requires C, 81.2; H, 4.35; N, 6.77%.

*Example 2,—4,4′-di-(benzoxazol-2-yl)-2-methylstilbene*

2-methyl-4,4′-stilbenedicarboxylic acid chloride was prepared from the corresponding acid according to the method of J.A.C.S. 68, 2167, (1946). The acid was obtained by hydrolysis of the dinitrile [J.A.C.S., 68, 2167 (1946)] which in turn was prepared according to the procedure of J.C.S., (1947), 690 (41 C.A. 6229a).

2-methyl-4,4′-stilbene dicarboxylic acid chloride (3.2 g.) (0.01 mole) was dissolved in hot dioxan (100 ml.) and o-aminophenol (2.2 g.) (0.02 mole) in dioxan (10 ml.) added. An immediate precipitate came down. The mixture was refluxed 2 hours to complete the reaction, cooled and the precipitate collected. There was obtained 3.7 g. of light brown solid product.

The above 3.7 g. (0.008 mole) 4,4′-di-(2-hydroxyphenylcarbamoyl)-2-methylstilbene was heated under vacuum in an oil bath at 320–340° until the reaction subsided. The product was cooled under vacuum and Soxhlet extracted with benzene. The benzene solution deposited 2.0 g. of 4,4′-di-(benzoxazol-2-yl)-2-methylstilbene as yellow flakes.

*Example 3.—4,4′-di(benzoxazol-2-yl)-α-cyanostilbene*

α-Cyanostilbene dicarboxylic acid chloride was prepared from the corresponding acid according to the method of J.A.C.S., 68, 2167 (1946). The acid was obtained by the partial hydrolysis of 4,4'-α-tricyanostilbene with $H_2SO_4$ in acetic acid at 140° (J.C.S., 1948, 1024). The latter was obtained by condensing p-cyanobenzaldehyde with p-cyanobenzyl cyanide (J.C.S. 1948, 1024).

α-Cyanostilbene dicarboxylic acid chloride (3.3 g.) was dissolved in hot dioxan (100 ml.) and o-aminophenol (2.2 g.) (0.02 mole) in dioxan (10 ml.) added. The addition caused an intermediate precipitate to form. The mixture was then refluxed 2 hours to complete the reaction, cooled and the final precipitate was collected. It consisted of 3.32 g. (70%) of a pale brown solid.

The above 3.32 g. 4,4'-di-(2-hydroxyphenylcarbamoyl)-α-cyanostilbene was heated under vacuum in an oil bath at 320–340° until the reaction subsided. The product was cooled under vacuum and Soxhlet extracted with benzene. The benzene solution deposited 1.84 g. (60%) of 4,4'-di - (benzoxazol-2-yl) - α-cyanostilbene as yellow flakes.

*Example 4.—4,4'-di(benzoxazol-2-yl)-2,2'-dimethylstilbene*

2,2'-dimethyl-4,4-stilbenedicarboxylic acid chloride was prepared by reacting the corresponding acid with thionyl chloride and phosphorus pentachloride. The acid was obtained by hydrolysis of the dinitrile with 10% KOH in propylene glycol [J.A.C.S., 68, 2167 (1946)]. The dinitrile resulted from the reaction of cuprous cyanide with α-carboxy-4,4'-dibromo-2,2'-dimethylstilbene. The latter was obtained by condensing potassium 4-bromo-2-methylphenyl acetate with 4-bromo-2-methylbenzaldehyde and acetic anhydride in the presence of pyridine [J.C.S. (1947), 690].

2,2' - dimethyl - 4,4' - stilbenedicarboxylic acid chloride (3.3 g.) (0.01 mole) was dissolved in hot dioxan (100 ml.) and o-aminophenol (2.2 g.) (0.02 mole) in dioxan (10 ml.) added. After an intermediate precipitate formed, the mixture was refluxed 2 hours to complete the reaction, cooled and the precipitate collected. There was obtained 3.1 g. (65%) of pale brown leaves of product. This 3.1 g. of 4,4'-di(2''-hydroxyphenylcarbamoyl)-2,2'-dimethylstilbene was heated under vacuum in an oil bath at 320–340° until the reaction subsided. The product was cooled under vacuum and Soxhlet extracted with benzene. The benzene solution yielded yellow leaves of 4,4'-di(benzoxazol-2-yl)-2,2'-dimethylstilbene (2.75 g.).

*Example 5.—4,4'-di-(6-methoxybenzoxazol-2-yl)stilbene*

4,4-stilbenedicarboxylic acid chloride (3.0 g.) prepared as in Example 3 was dissolved in hot dioxan (100 ml.) and 2-amino-5-methoxyphenol (2.78 g.) (Ber. 46, 3382) in dioxan (10 ml.) was added. After an intermediate precipitate came down the mixture was refluxed 2 hours to complete the reaction, cooled and the precipitate collected. There was obtained (3.7 g.), 75% of product.

The above 3.7 g. of 4,4'-di(2-hydroxy-4-methoxyphenylcarbamoyl)-stilbene was heated under vacuum in an oil bath at 320–340° until the reaction subsided. The product was cooled under vacuum and Soxhlet extracted with benzene. From the benzene solution there crystallized 2.28 g. of yellow flakes of 4,4'-di(6-methoxybenzoxazol-2-yl)-stilbene.

*Example 6.—4,4'-di(benzoxazol-2-yl)-2-nitrostilbene*

2-nitro-4,4'-stilbenedicarbonyl chloride was prepared from the corresponding acid and dinitrile according to the method of J.A.C.S. 68, 2167 (1946). The dinitrile was obtained by condensing 4-methyl-3-nitrobenzonitrile with 4-cyanobenzaldehyde according to U.S. patent 2,510,047, C.A. 44: P 9482b.

2-Nitro-4,4'-stilbenedicarbonyl chloride (3.5 g.) was dissolved in hot dioxan (100 ml.) and o-aminophenl 2.2 g. in dioxan (10 ml.) was added. After refluxing 2 hours to complete the reaction, the mixture was cooled and the precipitate collected. There was obtained 3.0 g. of yellow 4,4'-di(2-hydroxyphenyl carbamoyl)-2-nitrostilbene which was heated under vacuum in an oil bath at 320–340° until the reaction subsided. The product was cooled under vacuum and Soxhlet extracted with benzene. There crystallized from the benzene 2.1 g. of yellow leaves of 4,4'-di(benzoxazol-2-yl)-2-nitrostilbene.

*Example 7.—4,4'-di-(benzoxazol-2-yl)-2-aminostilbene*

4,4'-di(benzoxazol-2-yl)-2-nitrostilbene (2.1 g.) prepared as in Example 21 was reduced by treating with $SnCl_2$ in concentrated hydrochloric acid. Upon working up in the usual manner for stannous chloride reductions, there was obtained 1.2 g. of yellow plates of 4,4'-di-(benzoxazol-2-yl)-2-aminostilbene.

*Example 8.—4,4'-di(benzoxazol-2-yl)-2-hydroxystilbene*

The 4,4'-di(benzoxazol-2-yl)-2-aminostilbene (1.2 g.) of Example 7 was dissolved in 17 ml. of acetic and 3 ml. of propionic acid and diazotized at 0–5° by adding dropwise with stirring an equivalent of nitrosyl sulfuric acid in 5 cc. sulfuric acid and 10 cc. of acetic-propionic acid. When diazotization was complete the reaction mixture was poured into 100 cc. of water and boiled. Cooling yielded 0.96 g. of a yellow precipitate of 4,4'-di(benzoxazol-2-yl)-2-hydroxystilbene.

*Example 9.—4,4'-di(benzoxazol-2-yl)-2-chlorostilbene*

A solution of diazotized 4,4'-di(benzoxazol-2-yl)-2-aminostilbene (6.0 g.) prepared as described in Example 8 was poured into a solution of 3 g. freshly precipitated cuprous chloride dissolved in 10 ml. concentrated HCl and 15 cc. water. The reaction mixture was boiled and then cooled to yield a yellow precipitate of 4,4'-di(benzoxazol-2-yl)-2-chlorostilbene (4.4 g.).

*Example 10.—4,4-di(benzoxazol-2-yl)-2-cyanostilbene*

A solution of diazotized 4,4'-di(benzoxazol-2-yl)-2-aminostilbene (6.0 g.) prepared as described in Example 8 was carefully neutralized with sodium carbonate at 0–5°.

This neutralized diazonium solution was then added slowly with rapid stirring to a suspension of 5 g. of freshly precipitated cuprous cyanide in 20 ml. of water and 20 ml. of benzene. (See Organic Syntheses, Coll. vol. I. p. 514.) Upon the evolution of nitrogen, the product precipitated is partially taken up in the benzene. The precipitate and benzene layer were combined and heated. Upon cooling the benzene solution yielded 3.8 g. of 4,4'-di(benzoxazol-2-yl)-2-cyanostilbene as yellow leaflets.

*Example 11.—4,4'-bis(6-chlorobenzoxazol-2-yl)stilbene*

This compound was prepared by the method of Example 1 except that an equimolar amount of 2-amino-5-chlorophenol was used in place of the o-aminophenol in the third stage of the synthesis.

*Example 12.—4,4'-bis(6-methylsulfonylbenzoxazol-2-yl)stilbene*

This compound was prepared by the method of Example 1 except that an equimolar amount of 2-amino-5-methylsulfonylphenol was used in place of the o-aminophenol in the third stage of the synthesis.,

*Example 13.—4,4'-bis(5-cyanobenzoxazol-2-yl)stilbene*

This compound was prepared by the method of Example 1 except that an equimolar amount of 2-amino-4-cyanophenol was used in place of o-aminophenol in the third stage of the synthesis.

The following tabulation sets forth additional 4,4'-bis(benzoxazol-2-yl)stilbene fluorescent brightening agents within the scope of my invention. These compounds can be prepared in accordance with the procedure described hereinbefore. The compounds set forth are illustrative and not limitative of the 4,4'-bis(benzoxazol-2-yl)stilbene compounds within the scope of my invention.

1. 4,4'-bis(6-acetylbenzoxazol-2-yl)stilbene
2. 4,4'-bis(6-trifluoromethylbenzoxazol-2-yl)stilbene
3. 4,4'-bis(6-carbethoxybenzoxazol-2-yl)stilbene
4. 4,4'-bis(6-phenoxybenzoxazol-2-yl)stilbene
5. 4,4'-bis(6-dimethylsulfamylbenzoxazol-2-yl)stilbene
6. 4,4'-bis(6-dimethylcarbamylbenzoxabol-2-yl)stilbene
7. 4,4'-bis(6-thiocyanobenzoxazol-2-yl)stilbene 8. 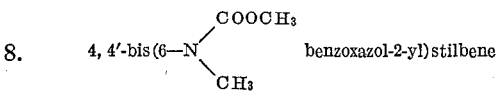

9. 4,4'-bis(6-chlorobenzoxazol-2-yl)stilbene
10. 4,4'-bis(6-bromobenzoxazol-2-yl)stilbene
11. 4,4'-bis(benzoxazol-2-yl)-2-methylsulfonylstilbene
12. 4,4'-bis(benzoxazol-2-yl)-2-dimethylsulfamlystilbene
13. 4,4'-bis(benzoxazol-2-yl)-2-acetylstilbene
14. 4,4'-bis(benzoxazol-2-yl)-2-thiocyanostilbene
15. 4,4'-bis(benzoxazol-2-yl)-2-trifluoromethylstilbene
16. 4,4'-bis(benzoxazol-2-yl)-2-carbomethoxystilbene 17. 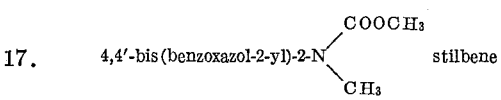

18. 4,4'-bis(6-methoxybenzoxazol-2-yl)-α,β-diethylstilbene
19. 4,4'-bis(6-chlorobenzoxazol-2-yl)-α,β-diethylstilbene
20. 4,4'-bis(6-ethylsulfonylbenzoxazol-2-yl)-α,β-diethylstilbene.
21. 4,4'-bis(6-dimethylsulfamlybenzoxazol-2-yl)-α,β-diethylstilbene
22. 4,4'-bis(6-dimethylcarbamylbenzoxazol-2-yl)-α,β-diethylstilbene
23. 4,4'-bis(6-trifluoromethylbenzoxazol-2-yl)-α,β-diethylstilbene
24. 4,4'-bis(6-difluoromethylbenzoxazol-2-yl)-α,β-diethylstilbene
25. 4,4'-bis(6-bromobenzoxazol-2-yl)-α,β-diethylstilbene
26. 4,4'-bis(5-methoxybenzoxazol-2-yl)-α,β-diethylstilbene
27. 4,4'-bis(5-chlorobenzoxazol-2-yl)-α,β-diethylstilbene
28. 4,4'-bis(5-thiomethylbenzoxazol-2-yl)-a,β-diethylstilbene
29. 4,4'-bis(5-ethylsulfonylbenzoxazol-2-yl)-α,β-diethylstilbene
30. 4,4'-bis(5-dimethylsulfamylbenzoxazol-2-yl)-α,β-diethylstilbene
31. 4,4'-bis(5-dimethylcarbamylbenzoxazol-2-yl)-α,β-diethylstilbene
32. 4,4'-bis(5-carbethoxybenzoxazol-2-yl)-α,β-diethylstilbene
33. 4,4'-bis(5-trifluoromethylbenzoxazol-2-yl)α,β-diethylstilbene
34. 4,4'-bis(5-hydroxybenzoxazol-2-yl)-α,β-diethylstilbene
35. 4,4'-bis(5-acetamidobenzoxazol-2-yl)-α,β-diethylstilbene
36. 4,4'-bis(6-methoxybenzoxazol-2-yl)-2-chlorostilbene
37. 4,4'-bis(6-dimethylcarbamylbenzoxazol-2-yl)-2-chlorostilbene
38. 4,4'-bis(6-acetamidobenzoxazol-2-yl)-2-chlorostilbene
39. 4,4'-bis(6-phenoxybenzoxazol-2-yl)-2-chlorostilbene
40. 4,4'-bis(6-bromobenzoxazol-2-yl)-2-chlorostilbene
41. 4,4'-bis(6-cyanobenzoxazol-2-yl)-2-chlorostilbene
42. 4,4'-bis(6-acetylbenzoxazol-2-yl)-2-chlorostilbene
43. 4,4'-bis(6-methoxybenzoxazol-2-yl)-2-acetamidostilbene
44. 4,4'-bis(6-acetamidobenzoxazol-2-yl)-2-acetamidostilbene
45. 4,4'-bis(6-cyanobenzoxazol-2-yl)-2-acetamidostilbene
46. 4,4'-bis(6-thiocyanobenzoxazol-2-yl)-2-acetamidostilbene
47. 4,4'-bis(6-methylbenzoxazol-2-yl)-2-acetamidostilbene
48. 4,4'-bis(6-dimethylsulfamylbenzoxazol-2-yl)-2-acetamidostilbene
49. 4,4'-bis(6-methoxybenzoxazol-2-yl)-2,2'-dimethylstilbene
50. 4,4'-bis(6-ethoxybenzoxazol-2-yl)-2,2'-dimethylstilbene
51. 4,4'-bis(6-dimethylsulfamylbenzoxazol-2-yl)-2,2'-dimethylstilbene
52. 4,4'-bis(6-thiomethylbenzoxazol-2-yl)-2,2'-dimethylstilbene
53. 4,4'-bis(6-cyanobenzoxazol-2-yl)-2,2'-dimethylstilbene
54. 4,4'-bis(6-acetamidebenzoxazol-2-yl)-2,2'-dimethylstilbene
55. 4,4'-bis(5-chlorobenzoxazol-2-yl)-2-chlorostilbene
56. 4,4'-bis(5-methoxybenzoxazol-2-yl)-2-methylstilbene
57. 4,4'-bis(5-bromobenzoxazol-2-yl)-2-methylstilbene
58. 4,4'-bis(5-thiomethylbenzoxazol-2-yl)-2-methylstilbene
59. 4,4'-bis(5-dimethylsulfamylbenzoxazol-2-yl)-2-methylstilbene
60. 4,4'-bis(5-trifluoromethylbenzoxazol-2-yl)-2-methylstilbene
61. 4,4'-bis(5-iodobenzoxazol-2-yl)-2-methylstilbene
62. 4,4'-bis(5-methovybenzoxazol-2-yl)-2-cyanostilbene
63. 4,4'-bis(5-methylmenzoxazol-2-yl)-2-cyanostilbene
64. 4,4'-bis(5-p-methoxyphenylbenzoxazol-2-yl)-2-cyanostilbene
65. 4,4'-bis(5-trifluoromethylbenzoxazol-2-yl)-2-cyanostilbene
66. 4,4'-bis(5-carbomethoxybenzoxazol-2-yl)-2-cyanostilbene
67. 4,4'-bis(5-acetamidobenzoxazol-2-yl)-2-cyanostilbene
68. 4,4'-bis(5-cyanobenzoxazol-2-yl)-2-cyanostilbene
69. 4,4'-bis(6-ethoxybenzoxazol-2-yl)-α-cyanostilbene
70. 4,4'-bis(6-phenoxybenzoxazol-2-yl)-α-cyanostilbene
71. 4,4'-bis(6-[p-methoxyphenoxy]benzoxazol-2-yl)-α-cyanostilbene
72. 4,4'-bis(6-carbomethoxybenzoxazol-2-yl)-α-cyanostilbene
73. 4,4'-bis(6-methoxybenzoxazol-2-yl)-α-cyanostilbene
74. 4,4'-bis(5-ethoxybenzoxazol-2-yl)-α-cyano-2-methyl-3'-chlorostilbene
75. 4,4'-bis(6-methoxybenzoxazol-2-yl)-α-cyano-2-methyl-3'-chlorostilbene For purposes of clarity it is here noted that by dimethylsulfamyl is meant the N,N-dimethylsulfamyl group having the formula —$SO_2N(CH_3)_2$. Similarly, by dimethylcarbamyl is meant the N,N-dimethylcarbamyl group having the formula —$CON(CH_3)_2$. Sulfamyl and carbamyl as used herein, are synonymous with sulfamoyl and carbamoyl as recognized by "The Naming and Indexing of Chemical Compounds from Chemical Abstracts," Introduction to the Subject Index of Chemical Abstracts, vol. 56 (January–June 1962).

The numbering used herein for benzoxazole is that given in The Ring Index, Patternson, Capell and Walker, second edition (1960), American Chemical Society. To illustrate, Compound 74, 4,4'-bis(5-ethoxybenzoxazol-2-yl)-α-cyano-2-methyl-3'-chlorostilbene has the formula:

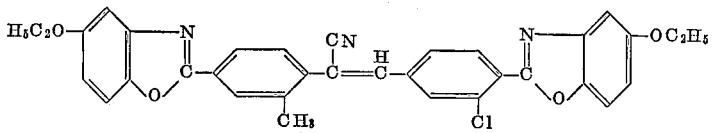

From the foregoing it is apparent that my invention provides novel fluorescent 4,4'-bis(benzoxazol-2-yl)-stilbene compounds which are useful as brightening agents for textile fibers, photographic color print materials, papers, resins and the like and are particularly useful as brightening agents for synthetic linear polyester fibers, for example, fibers such as poly(ethyleneterephthalate) and fibers of poly(1,4-cyclohexylenedimethyleneterephthalate) of the types disclosed in U.S. Patent 2,465,319 and U.S. Patent 2,901,446. The novel compounds of my invention are high-melting heat-stable yellow solids which in low concentrations in a substrate or solution exhibit, under ultraviolet light, a blue or blue-green to violet fluorescence.

The exact concentration of the novel fluorescent 4,4'-bis(benzoxazol-2-yl)stilbene compound used as a fluorescent whitening or brightening agent for polyester fibers may be varied widely. Particularly good results are obtained at concentrations of about 0.005 to about 0.5 percent by weight of the novel fluorescent 4,4'-bis(benzoxazol-2-yl)stilbene compound based on the weight of the polyester material treated. Especially useful results are obtained with poly(ethyleneterephthalate) fibers and poly(1,4 - cyclohexylenedimethyleneterephthalate) fibers containing from 0.01 to 0.05 percent by weight of the novel 4,4'-bis(benzoxazol-2-yl)stilbene compounds of my invention. The novel 4,4'-bis(benzoxazol-2-yl)stilbene compounds of my invention can be introduced into the polyester fiber by conventional disperse dyeing techniques or by other known methods.

Because of their excellent heat stability, these compounds can be incorporated into the melt from which a polyester fiber is spun. The resulting polyester composition exhibits excellent whiteness or brightness which is highly resistant to change by the action of light, commercial bleaches, various textile processing treatments and heat.

The following example illustrates the use of a preferred compound of my invention as a fluorescent whitener for a polyester fiber.

*Example 14*

The compound, 4,4'-bis(benzoxazol-2-yl)stilbene, when incorporated into an undyed polyester fiber, caused the fiber to exhibit a superior whiteness which remained virtually unchanged by over 60 hours exposure in a Fade-Ometer. The brightness of the fiber was also substantially unchanged by a series of textile processing treatments which included heat setting; immersion in numerous chemical baths; bleaching and stripping baths, and dye baths. In addition, the optical whitening effect was quite resistant to change by dry cleaning, crocking, gas fading, sublimation, washing and perspiration.

The brightening of dyed colors by the compounds of the invention also has a lasting effect. For example, polyester textile materials containing either a 4,4'-bis(benzoxazol-2-yl)stilbene or a 4,4'-bis(6-methylsulfonylbenzoxazol-2-yl)stilbene when dyed with a full color range of dispersed dyes have an improved brightness and the same fastness properties as samples of the same fabric containing no optical brightener.

The novel compounds of my invention are also useful in photographic color print materials comprising a white reflecting support carrying 3 silver halide emulsion layers, each sensitized to the red, green and blue ranges of the spectrum, wherein the top silver halide emulsion layer contains a dispersion of an organic solvent in which is dissolved or dispersed one or more of the novel compounds of my invention. For example, the top silver halide emulsion layer may contain an oily dispersed phase having dissolved therein a cyan forming color coupler and one or more of the novel compounds of my invention. Alternatively, one or more of the novel compounds of my invention may be dissolved in a separate oily phase dispersed within the said layer.

Photographic color prints made on the foregoing materials containing one or more of the novel fluorescent compounds of my invention show enhanced whiteness in the low density range of images formed in them due to the fluorescence of the novel compounds. Further, the inherent ultraviolet absorption of the novel compounds in the photographic color print material protects any magenta and yellow images developed in the layers below the cyan layer. The ultraviolet absorption of usual cyan dyes formed by color development prevents the said compounds from fluorescing in the cyan image areas and thereby obviates the "bloom" which occurs when fluorescent brightening agents are coated on top of color print materials or introduced therein by bathing.

The novel fluorescent 4,4'-bis(benzoxazol-2yl)-stilbene compounds within the scope of my invention comprise those compounds absorbing ultraviolet light and having a peak ultraviolet absorption in the range of 350 millimicrons to 390 millimicrons. These novel compounds have ultraviolet light molar absorptivities ranging from 47,000 to 94,000 when measured at the point of strongest ultraviolet absorption (lambda max.). In solution or on a substrate the novel fluoroescent compounds of my invention fluoresce visible light at a wavelength of maximum emission $$(\lambda^F_{max.})$$

of 420 to 450 millimicrons and thus appear green-blue violet when viewed in daylight or ultraviolet light. The preferred fluorescent 4,4'-bis(benzoxazol-2-yl)stilbene compounds of my invention impart little or no visible color to a polyester substrate when present therein in an amount effective for whitening or brightening purposes and, accordingly, are free of substituents which would cause the fluorescent compound to impart a visible color to the substrate when used in such an amount.

Further, the preferred fluorescent 4,4'-bis-(benzoxazol-2-yl)stilbene compounds of my invention have satisfactory stability. Thus, when incorporated in a polyester substrate in an amount effective for whitening or brightening purposes, the novel fluorescent compounds of my invention produce a composition of exceptional whiteness or brightness that is highly resistant to discoloration or loss of whiteness or brightness upon exposure to light, air, washing and bleaching agents such as sodium hypochlorite and calcium hypochlorite.

The preferred fluorescent 4,4'-bis(benzoxazol-2-yl)stilbene compounds of my invention have a Relative Fluorescence Index, as will be explained more fully hereinafter, of 3.40 or greater. The Relative Fluorescence Index is a measure of the relative brightness of the fluorescent stilbene compounds when used as a whitening or brightening agent. A compound having a satisfactory Relative Fluorescence Index number is not necessarily satisfactory as a whitening or brightening agent because it may be unstable or have too much intrinsic color as hereinbefore pointed out.

The Relative Fluorescence Index number ($\phi R$) referred to above is not general knowledge in the prior art in the field of optical brighteners. Hence, it is discussed as follows: There is a reciprocal relation between light absorption and emission from fluorescent compounds. Ideally, each absorbed light quantum would reappear as an emited quantum, and the fluorescence yield would be unity. However, in fluorescent compounds the emitted light has less energy and appears at longer wavelengths than the light that was absorbed. Some energy is lost as heat.

It is possible to specify the nature of the absorbed light by means of the molar absorptivity factor (Epsilon) which is the product of the ultraviolet absorptivity and the molecular weight of the compound. For 4,4'-bis-(benzoxazol-2-yl)stilbene the value is 79,488. It is calculated from the observations made at the wavelenth maximum $$(\lambda^{U.V.}_{max.})$$

of 373 millimicrons. The molar absorptivities of the novel fluorescent compounds of my invention range from 47,000 to 94,000 and the $$\lambda_{max.}^{U.V.}$$

values from 350 to 390 millimicrons.

It is possible through the application of special laboratory equipment to determine quantitative characteristics of the emitted light from fluorescent compounds, the wavelength value of the maximum emission $$(\lambda_{max.}^{Fl.})$$

and the Flourescence Index Number ($\phi R$). For 4,4'-bis(benzoxazol-2-yl)stilbene these values are 432 millimicrons and 4.99, respectively. In general, the emission maxima for the compounds of the invention range from about 420 to 450 millimicrons.

From the foregoing it may be seen that it is desirable to have as high a Relative Fluorescence Index number as possible without developing an undesirable color hue in the polyester product. The greater the Fluorescence Index number the lower the concentration of a given compound required to achieve a given level of brightness in the product. Fluorescent 4,4'-bis(benzoxazol-2-yl)stilbene compounds exhibiting a relative fluorescence index of 3.40 and above are particularly useful as whitening or brightening agents. However, some compounds with lower values are useful as whitening or brightening agents.

The Relative Fluorescence Index number ($\phi R$) is computed from the expression:

$$\phi R = \frac{F_A (0.12)(2)}{V_S \times C_S}$$

where $F_A$=relative fluorescence intensity as measured for a compound with a 931–A photomultiplier detector calibrated with a 2 ml. volume of aqueous quinine sulfate solution at a concentration of 20 micrograms per milliliter.
$V_S$=volume of sample in milliliters
$C_S$=concentration in micrograms per milliliter For example, 2 ml. of water solution of quinine sulfate at a concentration of 20 micrograms of quinine sulfate per milliliter has a $F_A$ value of 10.00 in the apparatus used to determine the relative index numbers. If the concentration of the test sample is specified at 0.12 microgram of fluorescent compound per milliliter in an organic solvent and a total volume of 2 milliliters of the solution is used in the test apparatus, a sufficient range of values is available for comparing the fluorescence properties of a large number of new compounds. This technique allows for the measurement of the Relative Fluorescence Index number for compounds that may have a higher fluorescence efficiency than the quinine sulfate standard and a higher level of luminosity than quinine sulfate at a concentration of 20 micrograms per milliliter. Thus, for example, a Relative Fluorescence Index of 4.0 may be interpreted as stating that the compound is 40 percent as bright as quinine sulfate as determined with the experimental apparatus by the standard test conditions.

The terms brightness and whiteness are used in their usual sense in accordance with the "Comparative List of Color Terms," a report of the Inter-Society Council, January 1949.

The hydrogen atoms or other substituents on the carbon atoms of the ethylene linkage of the stilbene moiety of the novel compounds of my invention may exist in either the cis or trans configuration or a mixture thereof.

My invention has been described in considerable detail with particular references to certain preferred embodiments thereof, but it will be understood that variations and modifications can be effected within the spirit and scope of the invention as described hereinabove, and as defined in the appended claims.

I claim:
1. A fluorescent compound of the formula

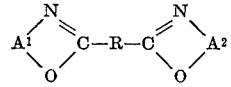

wherein R is a bivalent 4,4'-stilbene radical and each of the radicals $A^1$ and $A^2$ is an o-phenylene radical.

2. A fluorescent compound of the formula

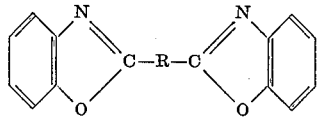

wherein R is a bivalent 4,4'-stilbene radical.

3. A fluorescent compound of the formula

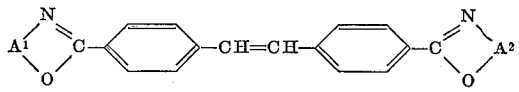

wherein each of the radicals $A^1$ and $A^2$ is an o-phenylene radical.

4. A fluorescent compound of the formula

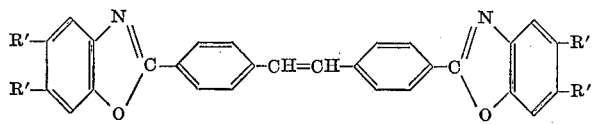

wherein R' is selected from the group consisting of hydrogen, halogen, alkyl, aryl, alkoxy, aryloxy, alkylsulfamyl, arylsulfamyl, cyano, acyl, acyloxy, amino, carbamyl and carbamoyloxy.

5. The fluorescent compound 4,4'-bis(benzoxazol-2-yl)stilbene.

6. The fluorescent compound 4,4'-bis(5-methoxybenzoxazol-2-yl)stilbene.

7. The fluoroescent compound 4,4'-bis(6-methylsulfonylbenzoxazol-2-yl)stilbene.

8. The fluorescent compound 4,4'-bis(6-chlorobenzoxazol-2-yl)stilbene.

9. The fluoroescent compound 4,4'-bis(5-cyanobenzoxazol-2-yl)stilbene.

References Cited by the Examiner
FOREIGN PATENTS 622,718    6/1961    Canada.
1,293,281    4/1962    France.

WALTER A. MODANCE, *Primary Examiner.*

JOHN D. RANDOLPH, *Assistant Examiner.*